United States Patent
Salamon et al.

(10) Patent No.: US 12,463,991 B2
(45) Date of Patent: Nov. 4, 2025

(54) MANAGING INITIATOR IDENTITIES

(71) Applicant: EMC IP Holding Company LLC, Hopkinton, MA (US)

(72) Inventors: Victor Salamon, Edmonton (CA); Paul Normand James Berube, Edmonton (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 398 days.

(21) Appl. No.: 17/341,626

(22) Filed: Jun. 8, 2021

(65) Prior Publication Data
US 2022/0394050 A1 Dec. 8, 2022

(51) Int. Cl.
*G06F 12/14* (2006.01)
*H04L 9/40* (2022.01)
*H04L 67/1097* (2022.01)

(52) U.S. Cl.
CPC ...... *H04L 63/1425* (2013.01); *H04L 63/0236* (2013.01); *H04L 63/102* (2013.01); *H04L 63/1483* (2013.01); *H04L 67/1097* (2013.01)

(58) Field of Classification Search
CPC ............. H04L 63/1425; H04L 63/0236; H04L 63/102; H04L 63/1483; H04L 67/1097; H04L 63/101; H04L 45/02; H04L 49/90; H04L 69/22; H04L 12/4633
See application file for complete search history.

(56) References Cited

U.S. PATENT DOCUMENTS

| | | | |
|---|---|---|---|
| 8,935,751 B1* | 1/2015 | Cardente | G06F 21/6218 726/28 |
| 10,148,483 B1* | 12/2018 | Lippitt | H04L 67/1097 |
| 2005/0002380 A1* | 1/2005 | Miller | H04L 41/12 370/352 |
| 2005/0172155 A1* | 8/2005 | Sheymov | H04L 63/1408 726/5 |
| 2007/0239989 A1* | 10/2007 | Barnett | H04L 67/1097 713/185 |
| 2009/0172151 A1* | 7/2009 | Davis | H04L 61/2046 709/224 |
| 2010/0100878 A1* | 4/2010 | Otani | H04L 67/1097 718/1 |

(Continued)

OTHER PUBLICATIONS

Unity Family Technical Documentation, Dell Technologies, https://www.delltechnologies.com/en-us/documentation/unity-family/unity-p-cli-user-guide/04-unity-cli-br-manage-hosts.htm, last visited Jun. 8, 2021.

*Primary Examiner* — Muhammad Raza
(74) *Attorney, Agent, or Firm* — Ryan, Mason & Lewis, LLP (57) ABSTRACT

Methods, apparatus, and processor-readable storage media for managing initiator identities are provided herein. An example computer-implemented method includes monitoring one or more port identifiers used by respective ones of a plurality of host initiators for accessing one or more storage components of a storage system; detecting, based on the monitoring, anomalous behavior of at least a first one of the host initiators, wherein the detecting comprises identifying that the first host initiator is using at least one same port identifier as a second one of the host initiators to access a particular one of the storage components; and performing at least one automated action in response to the detecting.

20 Claims, 7 Drawing Sheets

(56) References Cited

U.S. PATENT DOCUMENTS

| | | | | |
|---|---|---|---|---|
| 2012/0084862 A1* | 4/2012 | Freeman | ............ | G06F 21/56 |
| | | | | 726/23 |
| 2012/0324567 A1* | 12/2012 | Couto | ............ | H04L 41/0853 |
| | | | | 726/12 |
| 2014/0122751 A1* | 5/2014 | Myrah | ............ | G06F 13/40 |
| | | | | 710/16 |
| 2015/0109931 A1* | 4/2015 | Ma | ............ | H04L 47/10 |
| | | | | 370/235 |
| 2016/0179579 A1* | 6/2016 | Amann | ............ | G06F 9/5011 |
| | | | | 718/104 |
| 2018/0027020 A1* | 1/2018 | Pallas | ............ | H04L 12/4641 |
| | | | | 726/1 |
| 2019/0037524 A1* | 1/2019 | Isola | ............ | G01S 5/14 |
| 2019/0319846 A1* | 10/2019 | Dhanadevan | ............ | H04L 41/082 |
| 2020/0136897 A1* | 4/2020 | Smith | ............ | H04L 67/1097 |
| 2021/0144173 A1* | 5/2021 | Ghule | ............ | H04L 63/1416 |
| 2021/0314279 A1* | 10/2021 | Tummala | ............ | H04L 63/0281 |

* cited by examiner

MANAGING INITIATOR IDENTITIES

FIELD

The field relates generally to information processing systems, and more particularly to protecting data in such systems.

BACKGROUND

In the context of a storage system, hosts generally refer to the clients or servers in a network that can access the storage system using host initiators, where each host initiator is identified by a host initiator identifier. In some situations, the host initiator identifier may become compromised, and this can lead to data theft, data breaches, and/or data corruption, for example. Existing solutions fail to adequately protect against compromised host initiator identifiers.

SUMMARY

Illustrative embodiments of the disclosure provide techniques for managing initiator identities. In one embodiment, an exemplary computer-implemented method can include monitoring one or more port identifiers used by respective ones of a plurality of host initiators for accessing one or more storage components of a storage system; detecting, based on the monitoring, anomalous behavior of at least a first one of the host initiators, wherein the detecting comprises identifying that the first host initiator is using at least one same port identifier as a second one of the host initiators to access a particular one of the storage components; and performing at least one automated action in response to the detecting.

Illustrative embodiments of the disclosure can provide significant advantages relative to conventional data protection techniques. For example, one or more challenges associated with compromised initiator identifiers are overcome by the disclosed techniques through identifying and automatically invalidating compromised initiator identifiers.

These and other illustrative embodiments described herein include, without limitation, methods, apparatus, systems, and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
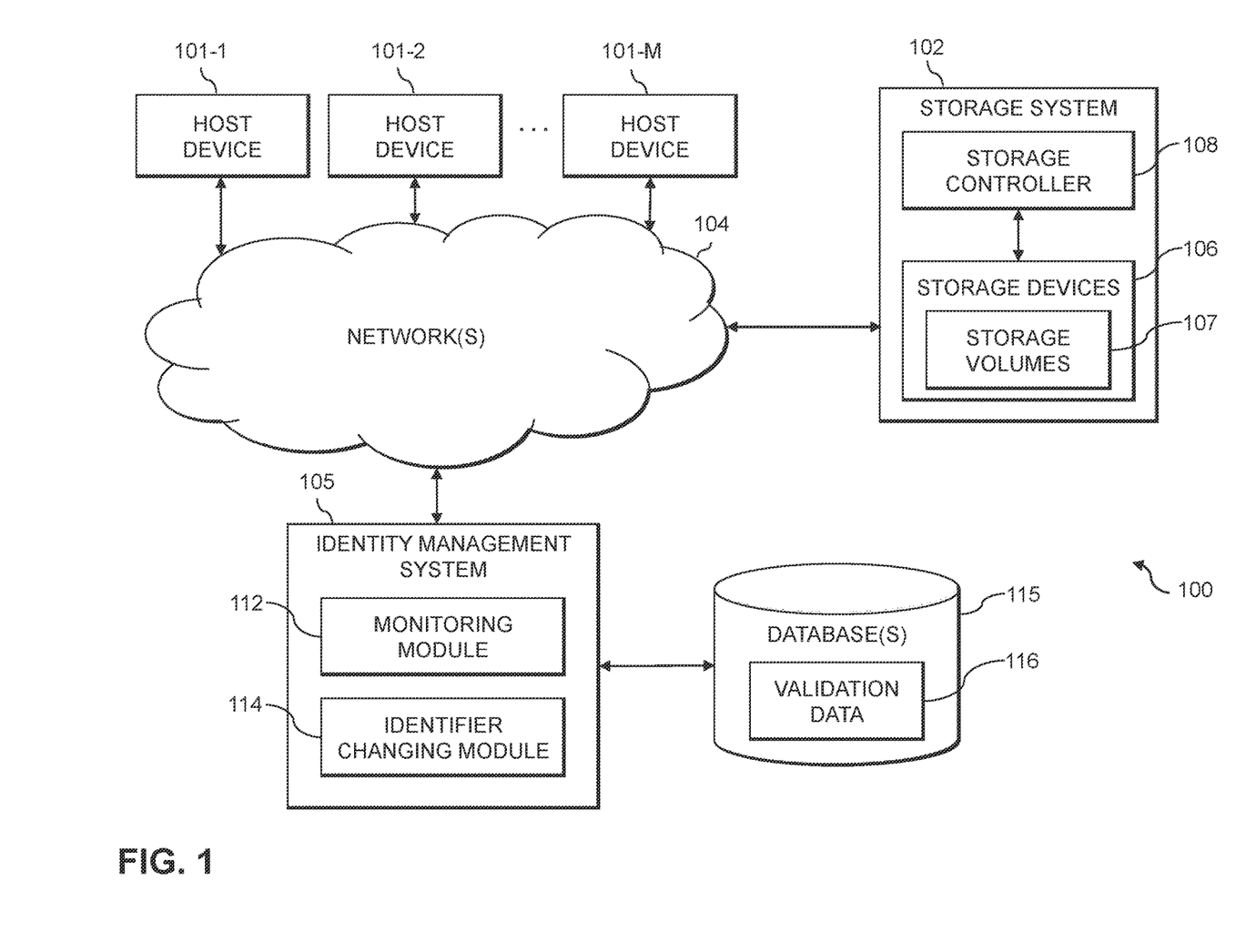
FIG. 1 shows an information processing system configured for managing initiator identities in an illustrative embodiment of the disclosure.

FIG. 1 shows an information processing system 100 configured in accordance with an illustrative embodiment. The information processing system 100 comprises a plurality of host devices 101-1, 101-2, . . . 101-M, collectively referred to herein as host devices 101, an identity management system 105, and a storage system 102. The host devices 101, the storage system 102 and the identity management system 105 are configured to communicate with each other over a network 104.

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices. Such applications illustratively generate input-output (IO) operations that are processed by the storage system 102. The term "input-output" as used herein refers to at least one of input and output. For example, IO operations may comprise write requests and/or read requests directed to logical addresses of a particular logical storage volume of the storage system 102. These and other types of IO operations are also generally referred to herein as IO requests.

Additionally, the identity management system 105 is assumed to be implemented using at least one processing device. Each such processing device generally comprises at least one processor and an associated memory, and implements one or more functional modules for controlling certain features of the identity management system 105.

In the FIG. 1 embodiment, the identity management system 105 includes a monitoring module 112 and an identifier changing module 114. The monitoring module 112, in some embodiments, monitors identifiers of host initiators associated with the storage system 102 to identify duplicate identifiers, for example. The identifier changing module 114, in some embodiments, performs a process for automatically changing one or more of the identifiers of the initiators, as described in more detail below.

It is to be appreciated that this particular arrangement of modules 112 and 114 illustrated in the identity management system 105 of the FIG. 1 embodiment is presented by way of example only, and alternative arrangements can be used in other embodiments. For example, the functionality associated with the modules 112 and 114 in other embodiments can be combined into a single module, or separated across a larger number of modules. As another example, multiple distinct processors can be used to implement different ones of the modules 112 and 114 or portions thereof.

At least portions of modules 112 and 114 may be implemented at least in part in the form of software that is stored in memory and executed by a processor.

The identity management system 105 can have at least one associated database 115 configured to store validation data 116 pertaining to, for example, validated host initiators, components of network 104, and components of storage system 102 (such as for example storage arrays), as described in more detail elsewhere herein. An example database 115, such as depicted in the present embodiment, can be implemented using one or more storage systems associated with the identity management system 105. Although the validation data 116 is shown in FIG. 1 as a separate component within database 115, in other embodiments, an additional or alternative instance of the validation data 116, or portions thereof, may be incorporated into the storage system 102.

The storage system 102 illustratively comprises processing devices of one or more processing platforms. For example, the storage system 102 can comprise one or more processing devices each having a processor and a memory, possibly implementing virtual machines and/or containers, although numerous other configurations are possible.

The storage system 102 can additionally or alternatively be part of cloud infrastructure such as an Amazon Web Services (AWS) system. Other examples of cloud-based systems that can be used to provide at least portions of the storage system 102 include Google Cloud Platform (GCP) and Microsoft Azure.

The host devices 101, the identity management system 105, and the storage system 102 may be implemented on a common processing platform, or on two or more separate processing platforms. The host devices 101 are illustratively configured to write data to and read data from the storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 102 comprises a plurality of storage devices 106 and an associated storage controller 108. The storage devices 106 store data of a plurality of storage volumes 107. The storage volumes 107 illustratively comprise respective logical units (LUNs) or other types of logical storage volumes. The term "storage volume" as used herein is intended to be broadly construed, and should not be viewed as being limited to any particular format or configuration.

The storage devices 106 of the storage system 102 illustratively comprise solid state drives (SSDs). Such SSDs are implemented using non-volatile memory (NVM) devices such as flash memory. Other types of NVM devices that can be used to implement at least a portion of the storage devices include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system 102.

It is therefore to be appreciated that numerous different types of storage devices 106 can be used in storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 102 illustratively comprises a scale-out all-flash distributed content addressable storage (CAS) system, such as an XtremIO™ storage array from Dell Technologies. A wide variety of other types of distributed or non-distributed storage arrays can be used in implementing the storage system 102 in other embodiments, including by way of example one or more Unity™ or PowerMax™ storage arrays, commercially available from Dell Technologies. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

In some embodiments, communications between the host devices 101 and the storage system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage system 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The host devices 101 are configured to interact over the network 104 with the storage system 102. Such interaction illustratively includes generating IO operations, such as write and read requests, and sending such requests over the network 104 for processing by the storage system 102. In some embodiments, each of the host devices 101 comprises a multi-path input-output (MPIO) driver configured to control delivery of IO operations from the host device to the storage system 102 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 102.

The MPIO driver may comprise, for example, an otherwise conventional MPIO driver, such as a PowerPath® driver from Dell Technologies. Other types of MPIO drivers from other driver vendors may be used.

The storage controller 108 and the storage system 102 may further include one or more additional modules and other components typically found in conventional implementations of storage controllers and storage systems, although such additional modules and other components are omitted from the figure for clarity and simplicity of illustration.

The storage system 102 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 102 in such an embodiment collectively comprise at least a portion of the storage controller 108 of the storage system 102. For example, in some embodiments the sets of processing modules of the storage nodes collectively comprise a distributed storage controller of the distributed storage system 102. A "distributed storage system" as that term is broadly used herein is intended to encompass any storage system that, like the storage system 102, is distributed across multiple storage nodes.

It is assumed in some embodiments that the processing modules of a distributed implementation of storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller illustratively comprise control modules, data modules, routing modules and at least one management module. Again, these and possibly other modules of a distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Communication links may be established between the various processing modules of the distributed storage controller using well-known communication protocols such as TCP/IP and remote direct memory access (RDMA). For example, respective sets of IP links used in data transfer and corresponding messaging could be associated with respective different ones of the routing modules.

Each storage node of a distributed implementation of storage system 102 illustratively comprises a CPU or other type of processor, a memory, a network interface card (NIC) or other type of network interface, and a subset of the storage devices 106, possibly arranged as part of a disk array enclosure (DAE) of the storage node. These and other references to "disks" herein are intended to refer generally to storage devices, including SSDs, and should therefore not be viewed as limited to spinning magnetic media.

The storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101, the storage system 102 and the identity management system 105 may be implemented in whole or in part on the same processing platform or on two or more separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in geographic locations that are remote from the first geographic location. Thus, it is possible in some implementations of the system 100 for the host devices 101, the storage system 102, and the identity management system 105 to reside in two or more different data centers. Numerous other distributed implementations of the host devices 101, the storage system 102 and the identity management system 105 are possible.

Additional examples of processing platforms utilized to implement host devices 101, storage system 102 and identity management system 105 in illustrative embodiments will be described in more detail below in conjunction with FIGS. 6 and 7.

It is to be appreciated that these and other features of illustrative embodiments are presented by way of example only, and should not be construed as limiting in any way. Accordingly, different numbers, types, and arrangements of system components such as host devices 101, storage system 102, network 104, identity management system 105, storage devices 106, storage volumes 107, storage controller 108, modules 112 and 114, and database 115 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Exemplary processes utilizing modules 112 and 114 will be described in more detail with reference to the flow diagrams of FIGS. 3-5.

Figure 2:
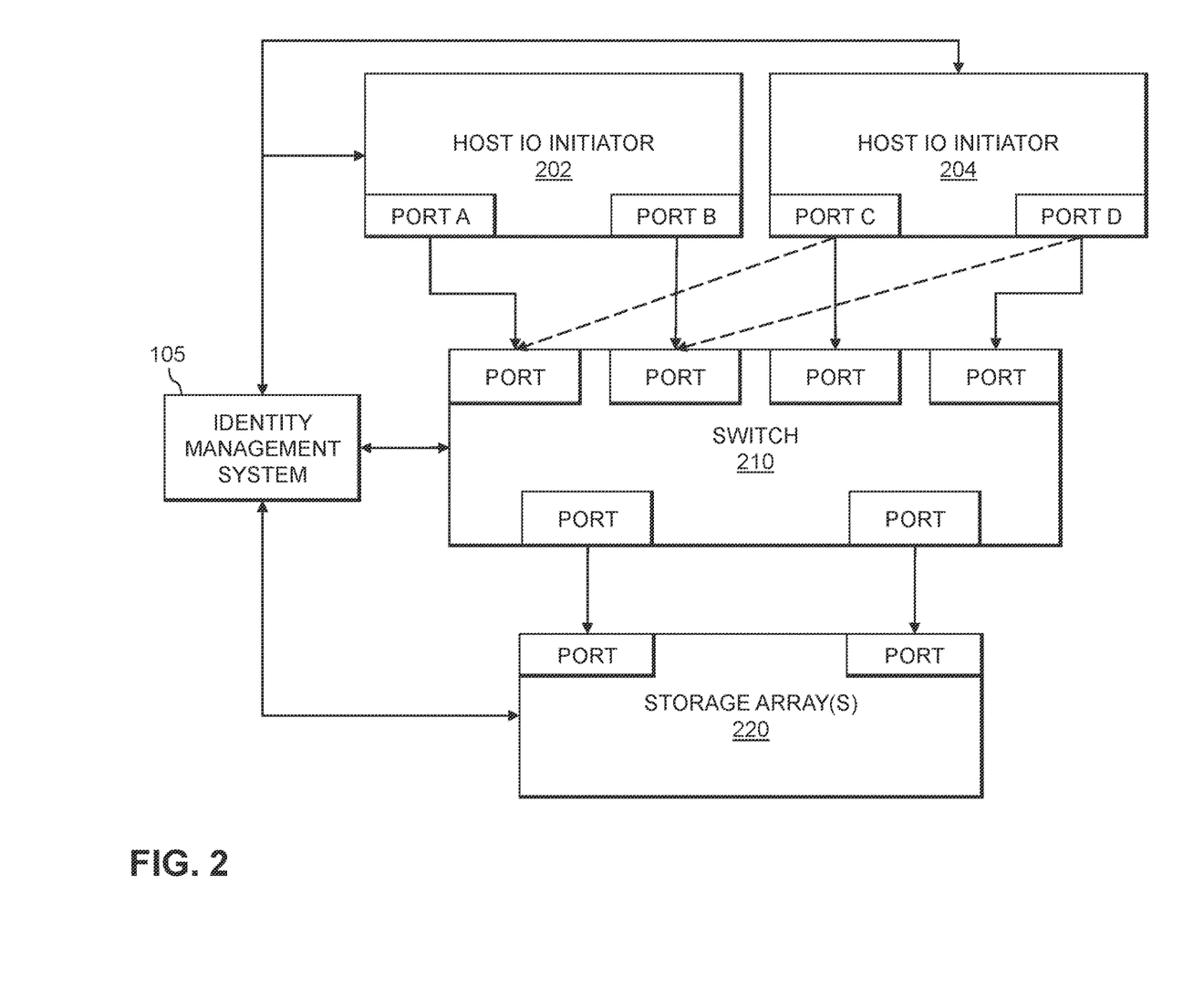
FIG. 2 shows an example of a storage network that includes an identity management system in an illustrative embodiment.

FIG. 2 shows an example of a storage network that includes an identity management system 105 in an illustrative embodiment. More specifically, FIG. 2 depicts two host initiators 202, 204 (which may also be referred to as host IO initiators) that are connected to a switch 210 and one or more storage arrays 220 (e.g., NAS). As an example, each of the host initiators 202, 204 may correspond to a different one of the host devices 101, the switch 210 may be associated with the network 104, and the one or more storage arrays 220 may be associated with the storage system 102.

Assume that host initiator 204 takes the identity of host initiator 202, which could be intentionally or accidentally (e.g., due to a defect or misconfiguration). In this situation, the host initiator 204 sets the identifiers of its ports to match the identifiers of the ports of host initiator 202. As an example, port A of host initiator 202 may have a legitimate initiator identifier of 0x1; and masquerading host initiator 204 may then assign itself the same initiator identifier of 0x1 for port C. Similarly, port B of host initiator 202 may have the legitimate initiator identifier of 0x2, and masquerading host initiator 204 may assign port C the initiator identifier of 0x2. Since ports C and D of host initiator 204 have assumed the identity of host initiator 202, host initiator 204 can have the same read and/or write access to the volumes of storage arrays 220 as host initiator 202. This can lead to data theft or privacy breaches if host initiator 204 reads data it should not, and/or data corruption if host initiator 204 writes to volumes it should not.

Some techniques to address such problems include physically protecting sensitive devices, such as, for example, by using locks, security guards, fences, etc. Existing data protection techniques for NAS are limited to protecting data at the presentation or data link layer of the Open Systems Interconnection (OSI) model (which is a conceptual framework that splits the communications between a computing system into seven different abstraction layers, namely, Physical, Data Link, Network, Transport, Session, Presentation, and Application). Such techniques include, for example, role-based access control and login authentication for administrative functions only (occurs at the session layer); encrypting the data itself on the host, and then sending the encrypted data to the storage array (occurs at the presentation layer); login and authentication to the host and application accessing the data (occurs at the session layer); and LUN zoning and/or masking for World Wide Names (WWNs) (occurring at the data link layer).

These techniques do not protect against a host masquerading its identity. A zoning technique typically involves a switch that is instructed to specify specific initiator ports that are allowed to interact with specific NAS ports. As shown by the dotted lines in FIG. 2, this protection measure can be easily thwarted by an attacker by disconnecting one or more of the legitimate ports A or B of host initiator 202 and connecting one or more of the masquerading ports of host initiator 204, either accidentally or intentionally.

A masking technique includes, for example, instructing the storage array 220 to allow access to certain volumes coming only from specified host initiator identifiers. However, since host initiator 204 masquerades the identity of host initiator 202, masking cannot distinguish between the ports of host initiator 202 and host initiator 204. As such, both masking and zoning are not sufficient for data protection purposes.

In at least some embodiments, the identity management system 105 is configured to monitor and/or enforce the identities of host initiators 202, 204 in the storage system. The identity management system 105 may operate at the login level (or session level). As noted herein, the identity management system 105 may run in a separate machine (e.g., virtual machine or physical machine) from host devices 101 and/or storage system 102. The identity management system 105, in some embodiments, is configured to communicate with various components associated with a storage system, such as host initiators 202, 204, switch 210, and storage array 220 as depicted in the example shown in FIG. 2.

Figure 3:
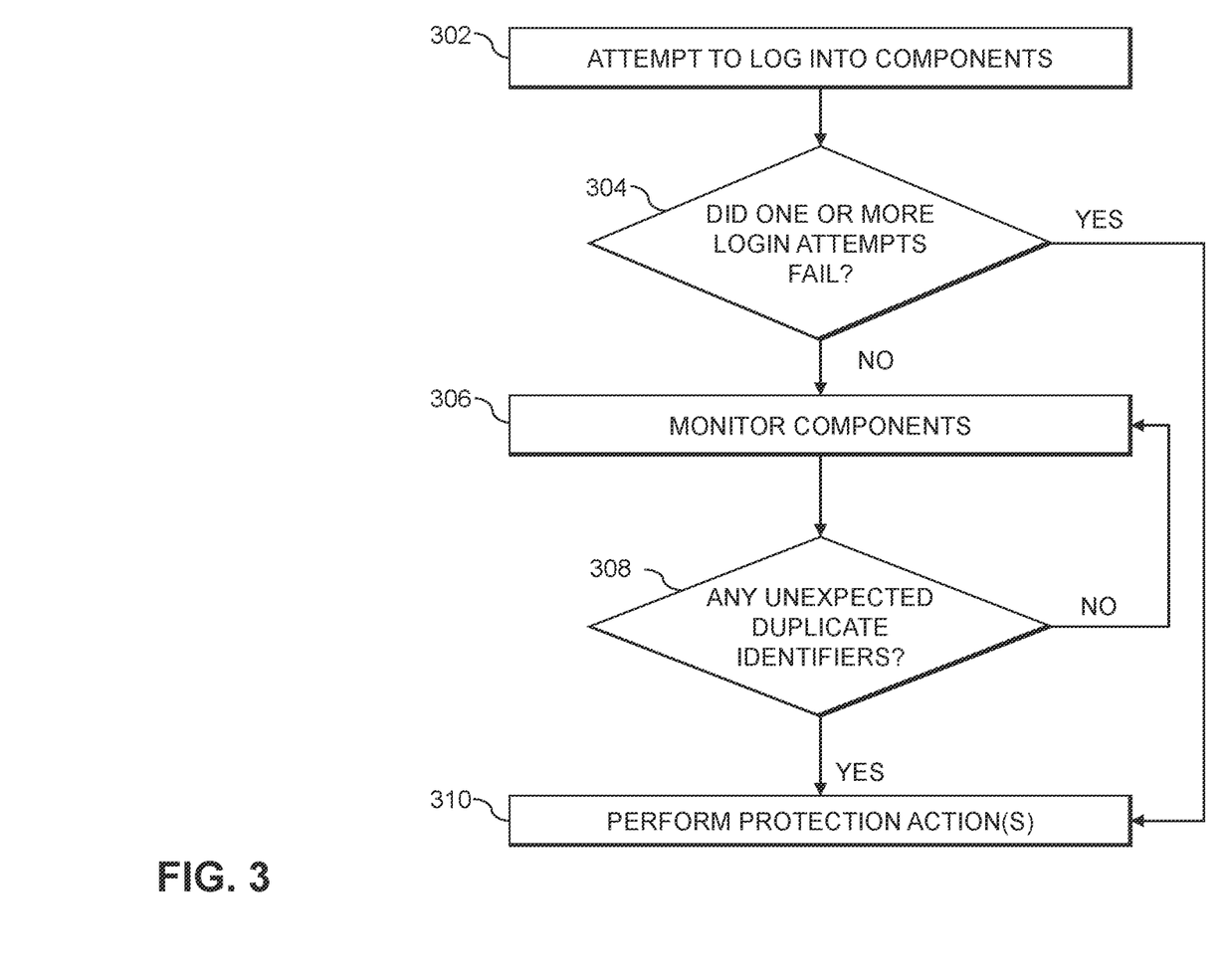
FIG. 3 shows an example of a process for protecting against compromised initiator identifiers in accordance with exemplary embodiments.

Referring also to FIG. 3, this figure shows an example of a process for protecting against compromised initiator identifiers in accordance with exemplary embodiments. It is assumed that the process is performed by the identity management system 105.

Step 302 includes attempting to log into each component (e.g., into each host 202, 204, switch 210 and storage array 220 that is powered on and connected to the network). Step 304 performs a test to determine if one or more of the login attempts from step 302 failed. If yes, then the process continues to step 310 to perform one or more protection actions. If no, then the process continues to step 306.

Step 306 includes monitoring each of the components. For example, the monitoring may include obtaining information related to ports and port identifiers corresponding to the various components. Such information can be stored as part of the validation data 116 in database 115 along with a list of validated components.

Step 308 includes performing a test to determine if there are any unexpected, duplicate host identifiers, initiator identifiers, and/or port identifiers connected to the same storage array(s). If there are one or more duplicated identifiers that are unexpected, then one or more protection actions are performed at step 310. Otherwise, the process continues to monitor the components at step 306. Duplicated identifiers are unexpected when the same identifier is used by more than one component of the same type (e.g., two host initiator ports have the same identifier).

As a non-limiting example, the list of validated components may be determined when the system is considered secure. For example, an administrator may provide an input specifying that the system is secure at a particular time, and a mapping of the components and their respective identifiers may be stored (or updated) in the database 115 in response to the input. Following that particular time, step 306 monitors for any changes in the identifiers. Any duplicate identifiers appearing for different components of the same type will be considered to be masquerading.

In some example embodiments, the one or more protection actions of step 310 may include the identity management system 105 performing one or more automated protections actions. The identity management system 105, in some example embodiments, may send a notification to an administrator and/or perform another remedial (or mitigation) action to address the detected anomalous behavior. For example, the performed remedial actions may comprise isolating, removing, quarantining, limiting permissions, analyzing, and deactivating one or more of the host devices 101 and/or one or more files, accounts or aspects of the host devices 101 (such as one or more ports, one more network cards, one or more chips, or one or more drivers associated with the host devices 101, for example); notifying one or more third party systems (such as sending an email, or generating an alert in another system); restricting access of at least one of: one or more ports, one more network cards, one or more chips, or one or more drivers, one or more accounts and one or more machines from accessing a network and/or one or more files or folders of the storage system 102; initiating a step-up authentication with one or more additional authentication factors; resetting or limiting permissions associated with a user, file or folder; quarantining one or more files or folders, and preventing one or more further actions from being executed associated with the host devices 101, user account or machine associated with the anomalous behavior.

As an example, if one or more login attempts fail at step 304, then the protection action at step 310 may include generating an alert or notification (e.g., to an administrator) that indicates the presence of one or more misconfigured components and/or a potentially rogue attacker in the system. In response to the alert, one or more manual actions may be performed (e.g., by an administrator), such as adjusting a configuration of one or more components or physically removing the attacking host device, for example.

Figure 4:
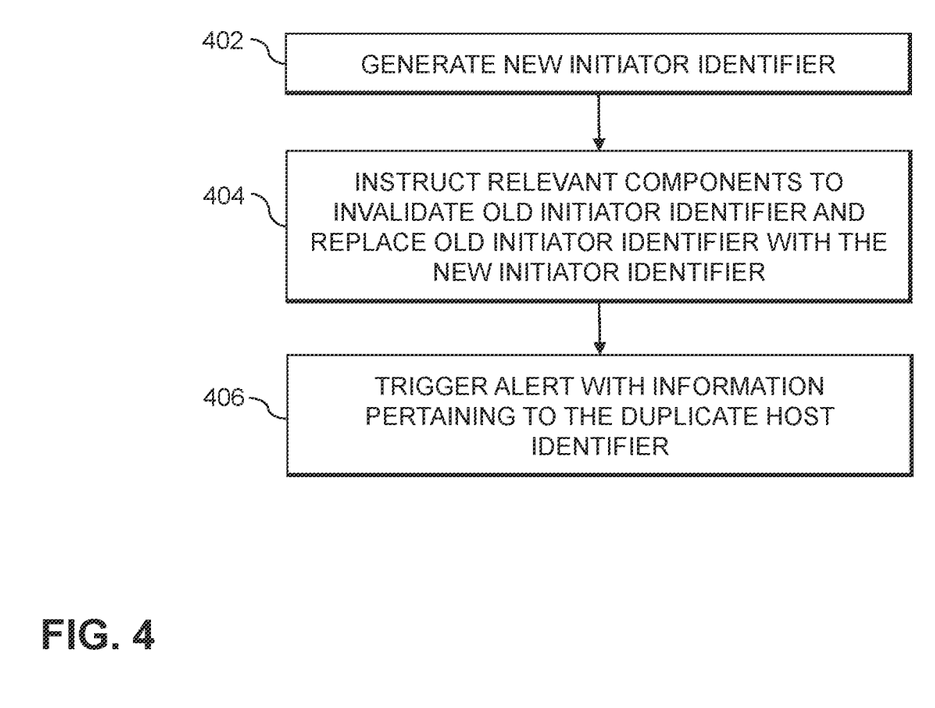
FIG. 4 shows an example of an automated protection action in an illustrative embodiment.

FIG. 4 shows an example of an automated protection action in an illustrative embodiment. The automated protection action may be performed at least in part by identity management system 105.

Step 402 includes generating a new unique initiator identifier. Step 404 includes instructing the relevant components in the data path to automatically invalidate the old initiator identifier (i.e., the duplicated identifier detected at step 308 of FIG. 3) that was being used in their current relationship and replace the old initiator identifier with the new initiator identifier. The relevant components include, for example, the validated host initiator 202, switch 210, and array 220 that are associated with the duplicated initiator identifier. In at least some examples, the validated components may also include the ports in the data path corresponding to the validated host initiator 202, switch 210, and array 220. By doing so, the zoning and masking records in the switch and array, respectively, use the newly generated unique identifier instead of the duplicated one. Thus, only the intended/validated host can access the array.

Optionally, step 406 triggers an alert (e.g., to an administrator) with information that can be used to physically locate and isolate (or correct) the duplicating host. For example, the information may include which switch port the host connected through.

Aspects of the automated protection action of FIG. 4 are now described in more detail with reference to the example described above in conjunction with FIG. 2. In the FIG. 2 example, port C and port D of host initiator 204 were assigned the same initiator identifiers as port A and port B of a legitimate host initiator 202, namely, 0x1 and 0x2, respectively. In this situation, the automated protection action may include generating two new unique identifiers, say, 0x3 and 0x4. The host device associated with host initiator 202 is instructed to pause IO operations in order to avoid potential IO errors from occurring while the protection action.

Next, the following instructions are sent:
1. The corresponding storage array(s) 220 are instructed to replace: (i) masking and SCSI login records of port A of host initiator 202 having the identifier of 0x1, with the new identifier 0x3, and (ii) masking and SCSI login records of port B of host initiator 202 having the identifier of 0x2, with the new identifier 0x4. This effectively invalidates port identifiers 0x1 and 0x2 so that the host initiator 204 (as well as the host initiator 202) can no longer access the storage array(s) 220 because the masking on the storage array(s) 220 no longer has valid login records with identifiers 0x1 and 0x2.
2. The switch 210 is instructed to change the zoning records between host 202 and the storage array(s) 220, to allow only: the new identifier 0x3 of port A, and the new identifier 0x4 of port B.
3. The host initiator 202 is instructed to change the identifiers of: Port A to 0x3, and Port B to 0x4.
4. Host initiator 202 is instructed to resume IO operation.

Steps 1-3, which relate to replacing identity records without having to go through a re-login process, may be performed in parallel. This provides an efficient process that avoids IO errors (as the IO operations do not resume until step 4) and preserves data access continuity. Also, in at least some example embodiments, the instructions to the storage array(s) 220, at least one switch 210, and the host initiator 202 can include a bulk set of identities to replace. Such embodiments are much faster than having to re-establish, for example, SCSI logins end-to-end for each compromised port identifier.

It is also to be appreciated that at least some of the examples are described with reference to SCSI, however this is not intended to be limiting, and the same algorithm can apply to any protocol that depends on initiator identifiers for login.

In at least some embodiments, the process for automatically changing the initiator identifiers throughout the components can be performed without the monitoring (e.g., of step 306). For example, in at least one embodiment, the initiator identifiers are automatically changed according to a schedule as a preemptive security measure to thwart wouldbe attackers. Such embodiments may be applied in situations when one or more of the host initiators cannot be accessed (such as, for example, due to a failed login attempt). Additionally, the initiator identifiers may be automatically changed for reasons other than security, such as when a software upgrade forces initiator identifiers to be changed into a different range, for example.

Figure 5:
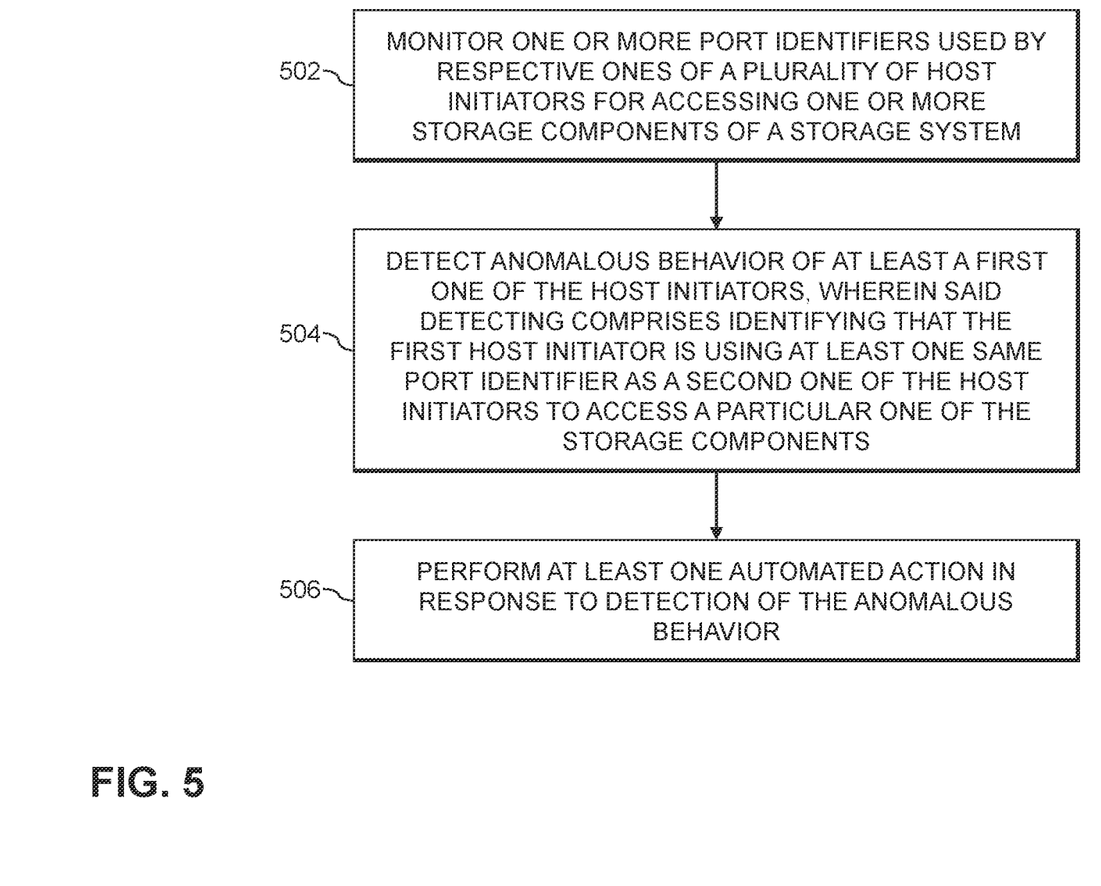
FIG. 5 is a flow diagram of a process for managing initiator identities in an illustrative embodiment.

FIG. 5 is a flow diagram of a process for managing initiator identities in an illustrative embodiment. It is to be understood that this particular process is only an example, and additional or alternative processes can be carried out in other embodiments.

In this embodiment, the process includes steps 502 through 506. These steps are assumed to be performed by the identity management system 105 utilizing its modules 112 and 114.

Step 502 includes monitoring one or more port identifiers used by respective ones of a plurality of host initiators for accessing one or more storage components of a storage system. Step 504 includes detecting, based on the monitoring, anomalous behavior of at least a first one of the host initiators, wherein the detecting comprises identifying that the first host initiator is using at least one same port identifier as a second one of the host initiators to access a particular one of the storage components. Step 506 includes performing at least one automated action in response to the detecting.

The at least one automated action may include: generating at least one new port identifier; and providing instructions to the second host initiator to replace the at least one same port identifier with the at least one new port identifier. The at least one automated action may further include providing instructions to the particular storage component to replace at least one masking record associated with the second host initiator based at least in part on the at least one new port identifier; and providing instructions to a switch between the second host initiator and the storage system to change one or more zoning records associated with the second host initiator and the particular storage component based at least in part on at least one new port identifier. The instructions to the second host initiator, the particular storage component, and the switch may be provided in parallel. The process depicted in FIG. 5 may include maintaining validation information that identifies validated ports of at least one of: (i) one or more of the host initiators, (ii) one or more of the storage components, and (iii) one or more switches associated with the storage system. The validation information may further identify port identifiers of the validated ports. The at least one automated action may include generating an alert comprising information of the anomalous behavior. The information may indicate a location of the first host initiator. The monitoring of step 502 may include logging into the plurality of host initiators to obtain a list of ports associated with the host initiators. The monitoring may include at least one of: logging into at least a portion of the storage system to obtain a list of ports associated with at least one of the storage components; and logging into at least one switch to obtain a list of ports corresponding to the at least one switch. The process may further include generating an alert indicating that at least one of the host initiators is misconfigured in response to a failed login attempt.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to monitor and/or enforce initiator identities in storage systems. These and other embodiments can effectively reduce the need for other, costly physical security measures, protect against physical or configuration attacks on data reads and data writes, and provide automated auditing and reporting to help quickly locate compromised hosts, even when the compromised hosts masquerade intermittently.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices, storage systems and an identity management system with functionality for managing initiator identities will now be described in greater detail with reference to FIGS. 6 and 7. Although described in the context of system 100, these platforms may also be used to implement at least portions of other information processing systems in other embodiments.

Figure 6:
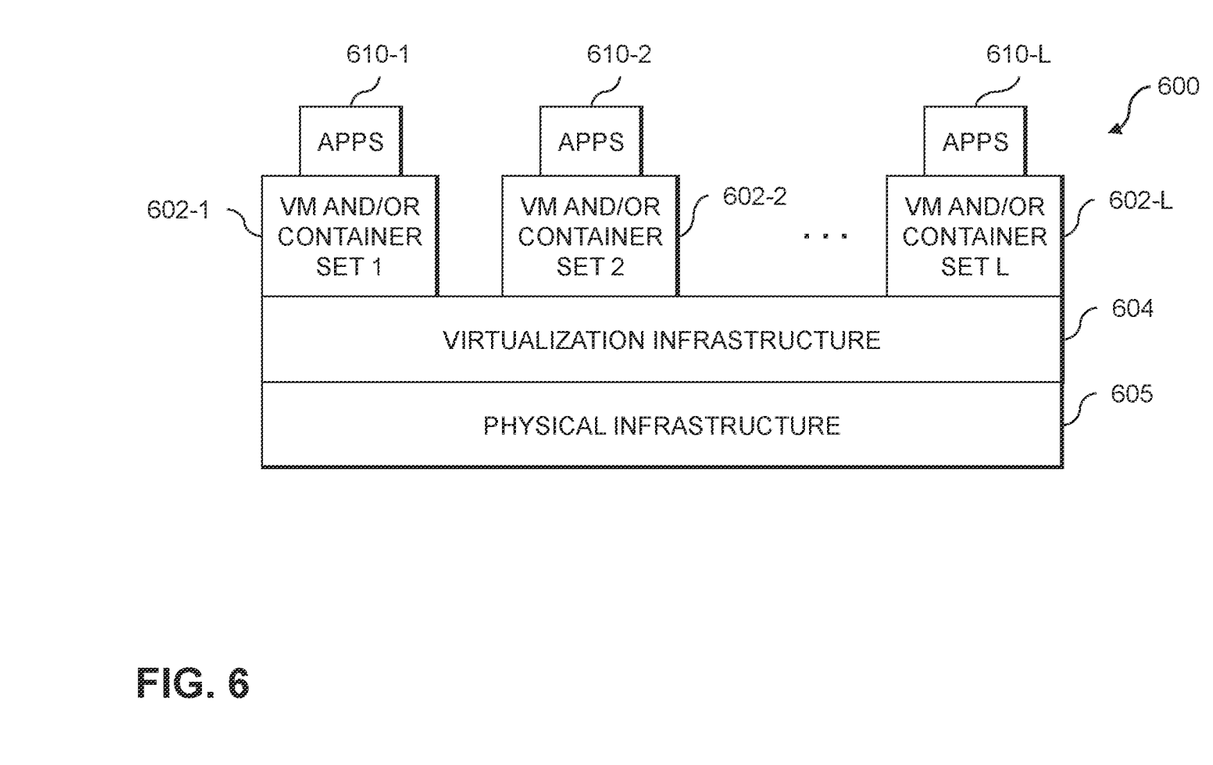
FIGS. 6 and 7 show examples of processing platforms that may be utilized to implement at least a portion of an information processing system in illustrative embodiments.
Figure 7:
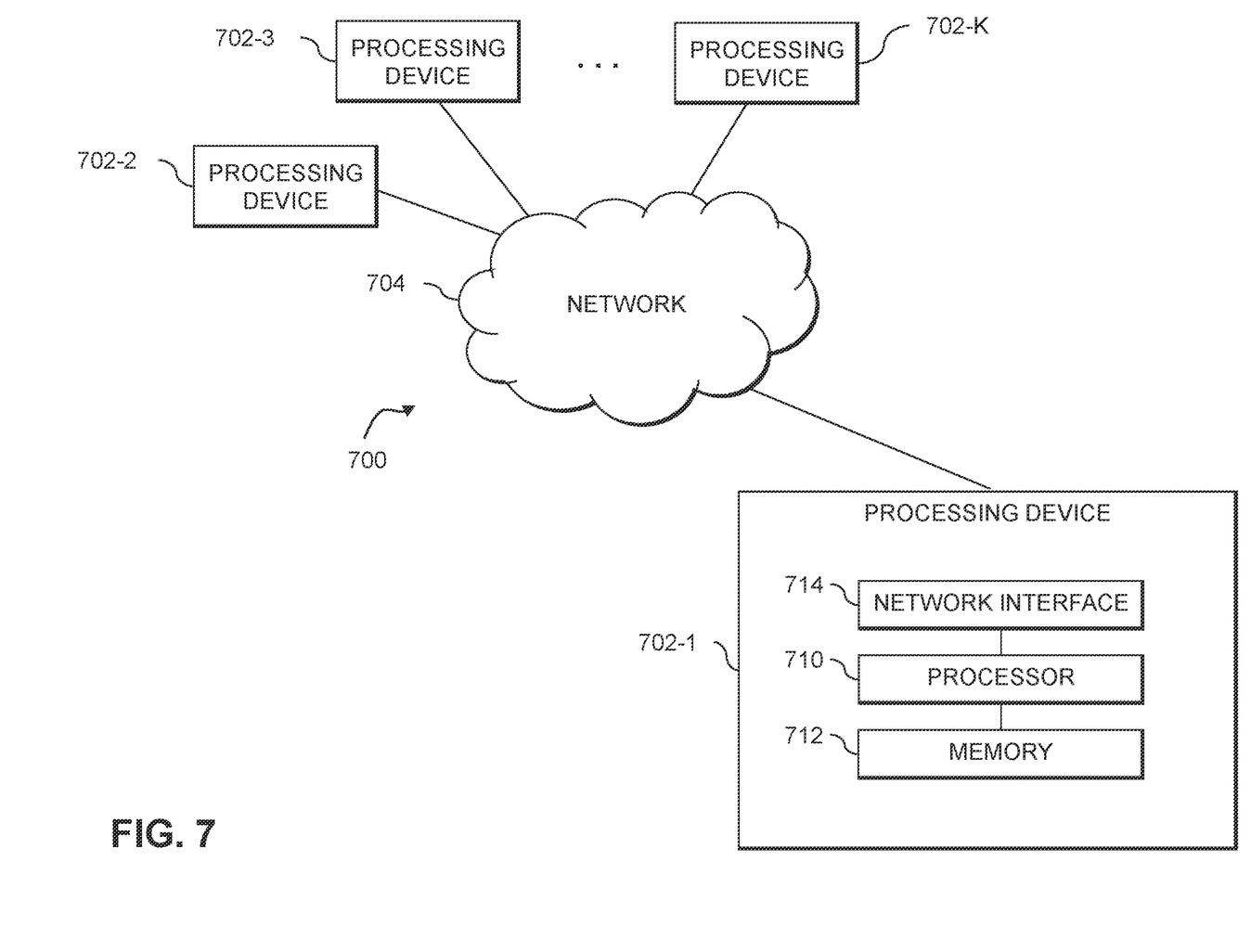

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide functionality for managing initiator identities in a storage system of the type described above using one or more processes running on a given one of the VMs. For example, each of the VMs can implement module 112, module 114, and/or other components for implementing functionality for managing initiator identities in the storage system 102.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide functionality for managing initiator identities in a storage system of the type described above. For example, a container host device supporting multiple containers of one or more container sets can implement one or more instances of the module 112, module 114, and/or other components for implementing functionality for managing initiator identities in the storage system 102.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise RAM, read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™ VxRack™ FLEX, VxBlock™, or Vblock® converged infrastructure from Dell Technologies.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components for managing initiator identities of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage devices, storage controllers, and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
accessing a plurality of host initiators to obtain a list of ports associated with the host initiators;
monitoring, based at least in part on the obtained list of ports, one or more port identifiers of respective ones of the plurality of host initiators for accessing one or more storage components of a storage system;
detecting, based on the monitoring, anomalous behavior of at least a first one of the host initiators, wherein the detecting comprises identifying that the first host initiator comprises at least one same port identifier as a second one of the host initiators to access a particular one of the storage components; and
performing, in response to the detecting, at least one automated action to prevent the first host initiator from accessing the particular one of the storage components, wherein the at least one automated action comprises: generating at least one new port identifier, and providing instructions to adjust respective configurations of the second host initiator, the particular storage component, and a switch between the second host initiator and the storage system based at least in part on the at least one new port identifier, wherein the instructions cause: (i) the second host initiator to replace the at least one same port identifier with the at least one new port identifier; (ii) the particular storage component to replace at least one masking record, associated with the second host initiator and the at least one same port identifier, with at least one new masking based at least in part on the at least one new port identifier; and (iii) the switch to update one or more zoning records associated with the second host initiator based at least in part on the at least one new port identifier, thereby invalidating the at least one same port identifier on the second host initiator, the particular storage component, and the switch, and reestablishing access for the second host initiator using the at least one new port identifier;

wherein the method is performed by at least one processing device comprising a hardware processor.

2. The computer-implemented method of claim 1, wherein the instructions to the second host initiator, the particular storage component, and the switch are provided in parallel.

3. The computer-implemented method of claim 1, further comprising:

maintaining validation information that identifies validated ports of at least one of: (i) one or more of the host initiators and (ii) one or more of the storage components, wherein the detecting that the first host initiator comprises the at least one same port identifier as the second host initiator is based at least in part on the monitoring and the validation information.

4. The computer-implemented method of claim 3, wherein the validation information further identifies port identifiers of the validated ports.

5. The computer-implemented method of claim 3, wherein the validation information comprises one or more switches associated with the storage system.

6. The computer-implemented method of claim 1, wherein the at least one automated action further comprises:

generating an alert comprising information of the anomalous behavior, wherein the information of the anomalous behavior indicates a location of the first host initiator.

7. The computer-implemented method of claim 1, wherein the accessing comprises at least one of:

logging into at least a portion of the storage system to obtain a list of ports associated with at least one of the storage components; and
logging into at least one switch to obtain a list of ports corresponding to the at least one switch.

8. The computer-implemented method of claim 7, further comprising:

generating an alert indicating that at least one of the host initiators is misconfigured in response to a failed login attempt.

9. The computer-implemented method of claim 1, further comprising:

in response to a failed attempt to access at least one host initiator in the plurality of host initiators, initiating a change to the port identifier of at least one other host initiator in the plurality of host initiators.

10. The computer-implemented method of claim 1, wherein accessing the plurality of host initiators to obtain the list of ports associated with the host initiators comprises:

logging into the plurality of host initiators.

11. A non-transitory processor-readable storage medium having stored therein program code of one or more software programs, wherein the program code when executed by at least one processing device causes the at least one processing device:

to access a plurality of host initiators to obtain a list of ports associated with the host initiators;
to monitor, based at least in part on the obtained list of ports, one or more port identifiers of respective ones of a plurality of host initiators for accessing one or more storage components of a storage system;
to detect, based on the monitoring, anomalous behavior of at least a first one of the host initiators, wherein the detecting comprises identifying that the first host initiator comprises at least one same port identifier as a second one of the host initiators to access a particular one of the storage components; and
to perform, in response to the detecting, at least one automated action to prevent the first host initiator from accessing the particular one of the storage components, wherein the at least one automated action comprises: generating at least one new port identifier, and providing instructions to adjust respective configurations of the second host initiator, the particular storage component, and a switch between the second host initiator and the storage system based at least in part on the at least one new port identifier, wherein the instructions cause: (i) the second host initiator to replace the at least one same port identifier with the at least one new port identifier; (ii) the particular storage component to replace at least one masking record, associated with the second host initiator and the at least one same port identifier, with at least one new masking based at least in part on the at least one new port identifier; and (iii) the switch to update one or more zoning records associated with the second host initiator based at least in part on the at least one new port identifier, thereby invalidating the at least one same port identifier on the second host initiator, the particular storage component, and the switch, and reestablishing access for the second host initiator using the at least one new port identifier.

12. The non-transitory processor-readable storage medium of claim 11, wherein the program code further causes the at least one processing device:

to maintain validation information that identifies validated ports of at least one of: (i) one or more of the host initiators, (ii) one or more of the storage components, and (iii) port identifiers of the validated ports, wherein the detecting that the first host initiator comprises the at least one same port identifier as the second host initiator is based at least in part on the monitoring and the validation information.

13. The non-transitory processor-readable storage medium of claim 12, wherein the validation information further identifies port identifiers of the validated ports.

14. The non-transitory processor-readable storage medium of claim 11, wherein the instructions to the second host initiator, the particular storage component, and the switch are provided in parallel.

15. The non-transitory processor-readable storage medium of claim 11, wherein the at least one automated action further comprises:

generating an alert comprising information of the anomalous behavior, wherein the information of the anomalous behavior indicates a location of the first host initiator.

16. An apparatus comprising:
at least one processing device comprising a processor coupled to a memory;
the at least one processing device being configured:
to access a plurality of host initiators to obtain a list of ports associated with the host initiators;
to monitor, based at least in part on the obtained list of ports, one or more port identifiers of respective ones of a plurality of host initiators for accessing one or more storage components of a storage system;
to detect, based on the monitoring, anomalous behavior of at least a first one of the host initiators, wherein the detecting comprises identifying that the first host initiator comprises at least one same port identifier as a second one of the host initiators to access a particular one of the storage components; and
to perform, in response to the detecting, at least one automated action to prevent the first host initiator from accessing the particular one of the storage components, wherein the at least one automated action comprises: generating at least one new port identifier, and providing instructions to adjust respective configurations of the second host initiator, the particular storage component, and a switch between the second host initiator and the storage system based at least in part on the at least one new port identifier, wherein the instructions cause: (i) the second host initiator to replace the at least one same port identifier with the at least one new port identifier; (ii) the particular storage component to replace at least one masking record, associated with the second host initiator and the at least one same port identifier, with at least one new masking based at least in part on the at least one new port identifier; and (iii) the switch to update one or more zoning records associated with the second host initiator based at least in part on the at least one new port identifier, thereby invalidating the at least one same port identifier on the second host initiator, the particular storage component, and the switch, and reestablishing access for the second host initiator using the at least one new port identifier.

17. The apparatus of claim 16, wherein the at least one processing device is further configured:
to maintain validation information that identifies validated ports of at least one of: (i) one or more of the host initiators and (ii) one or more of the storage components, wherein the detecting that the first host initiator comprises the at least one same port identifier as the second host initiator is based at least in part on the monitoring and the validation information.

18. The apparatus of claim 17, wherein the validation information further identifies port identifiers of the validated ports.

19. The apparatus of claim 16, wherein the instructions to the second host initiator, the particular storage component, and the switch are provided in parallel.

20. The apparatus of claim 16, wherein the at least one automated action further comprises:
generating an alert comprising information of the anomalous behavior, wherein the information of the anomalous behavior indicates a location of the first host initiator.

* * * * *